United States Patent [19]

Laesch

[11] 4,387,836

[45] Jun. 14, 1983

[54] GOLF BAG CARRIER

[76] Inventor: Daniel A. Laesch, 212 Greenwood Ave., R R. 7, Bloomington, Ill. 61701

[21] Appl. No.: 281,888

[22] Filed: Jul. 9, 1981

[51] Int. Cl.³ .............................................. B62J 7/02
[52] U.S. Cl. .............................. 224/32 A; 280/289 A
[58] Field of Search ....................... 224/30, 31, 32, 39; 248/96; 280/47.26, 289 A; D34/16; D12/158, 16

[56] References Cited

U.S. PATENT DOCUMENTS 2,784,979  3/1957  Chamberlin et al. ............ 280/47.26
2,919,758  1/1960  Newton et al. .................... 180/210

Primary Examiner—Steven M. Pollard
Assistant Examiner—D. Voorhees
Attorney, Agent, or Firm—Kalish & Gilster

[57] ABSTRACT

A golf bag carrier for an adult-style pedal-powered tricycle or quadra-cycle including tubular axle housing portions enclosing opposite ends of the rear axle. The carrier includes an elongated golf bag supporting frame member having an upstanding rectilinear portion substantially co-extensive with most of the height of the golf bag and a base portion underlying the golf bag. The base portion carries a support pedestal for supporting the weight of the golf bag. A plurality of curvilinearly configured lateral frame members are affixed to the supporting frame member and extend laterally from it for surroundingly cradling a portion of the golf bag to maintain same laterally dispositioned in substantially parallel relationship with the upstanding frame portion. A pair of upstanding frame support members each includes an upright rectilinear portion affixed to each of the lateral frame members. Each frame support member also has securement portions at its lower end extending forwardly relative to the supporting frame member for lying proximate a corresponding axle housing portion. A clamping fixture is carried by each such secure-member portion for clampingly engaging a respective axle housing portion to secure the golf bag carrier to the tricycle or quadra-cycle with the golf bag oriented in upstanding relationship upwardly from and rearwardly of the axle with the weight thereof stably supported by the carrier.

6 Claims, 6 Drawing Figures

GOLF BAG CARRIER

BACKGROUND AND SUMMARY OF THE INVENTION

This invention relates to golfing accessories and, more particularly, to a new carrier for golf bags for use with pedal-powered adult-style tricycles, quadra-cycles (four wheel cycles) and the like.

For the golfer who plays an average golf course of nine holes, eighteen holes, or more, and who must cover a substantial distance in playing through the course, there are limited number of options when it comes to carrying and transporting the usually heavy bag of numerous irons and woods.

The golfer may walk the course, carrying his heavy bag, or may pull it behind him on a wheeled cart. The golfer may also hire the services of a caddy. Further, if he is inclined to relieve himself of still more opportunity for exercise, and thus chooses not to derive the exercise benefit inherent in walking, the golfer may utilize an electric or other powered golf cart.

However, there exist pedal-powered contrivances, such as bicycles, tricycles and quadra-cycles which are more mechanically efficient and comfortable than walking over the long distance required yet which offer superiod exercise, particularly as constrasted with powered golf carts, while preserving all of the quiet and pleasure of golf.

The present invention is intended to permit the utilization by the golfer of an adult-style pedal-powered tricycle or quadra-cycle or the like.

The mounting of a golf bag on such a tricycle is an awkward proposition at best, it being difficult to secure the bag in a usable position reliably upon tricycles of the many different designs and manufactures presently available. Present designs of tricycles offer various impediments to the mounting of a bag carrying frame thereon and other problems and considerations must be kept in mind. For example, the weight of the bag, which is considerable when full of the various irons, woods, and balls and other accessories which many golfers are wont to carry, must be stably supported not only in a safe, reliable and secure manner but in an orientation permitting the golfer ready access to the clubs therein. Yet, the mounting arrangement for the golf bag must not interfere with operation and the normal operation of the tricycle, nor present the golf bag in such a position that it interferes with normal movements of the rider.

It is further to be kept in mind that some tricycles are equipped with a basket behind the seat. In the equippage of a tricycle with a golf bag in accordance with the invention, it is desirable to avoid any requirement for removal of the basket and to preserve its usual function. Therefore, an arrangement for carrying a golf bag on a tricycle must be compatible not only with the various design arrangements of tricycles but must also not interfere with the normal accessories or equipment of the tricycle or quadra-cycle.

Accordingly, it is an object of the present invention to provide a golf bag carrier for pedal-powered vehicles and especially pedal-powered adult-style tricycles.

It is a further object of the invention to provide such a golf bag carrier which is extremely easily secured to such a cycle and can be utilized with tricycles and quadra-cycles of numerous designs and styles made by various manufacturers.

It is a still further object of the invention to provide such a golf bag carrier which readily accommodates the rear axle arrangement of various tricycles and quadra-cycles without interfering with the normal functioning of the tricycle and without requiring removal of baskets or other accessories or equipment.

Another object of the invention is the provision of such a golf bag carrier which supports a golf bag in a reliable, safe and secure position with ready disposition of the bag for freely providing access thereto by the golfer for easy removal and replacement of clubs, balls and other golf accessories.

Yet another object of the invention is the provision of such a golf bag carrier which allows the bag to be easily installed upon and removed from the carrier without requiring fasteners, straps and various other time-consuming steps.

A further object of the invention is the provision of such a golf bag carrier which allows the golfer to operate the cycle in an entirely normal manner without any interference with movement or with the normal function of riding and without presenting any awkwardness or difficulty in use.

Among still other objects of the invention may be noted the provision of such a golf bag carrier which is simply and easily constructed of readily available materials being amenable to mass production manufacture, and which is strong, lightweight, durable and long-lasting in use.

Other objects and features will be in part apparent and in part pointed out hereinbelow.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
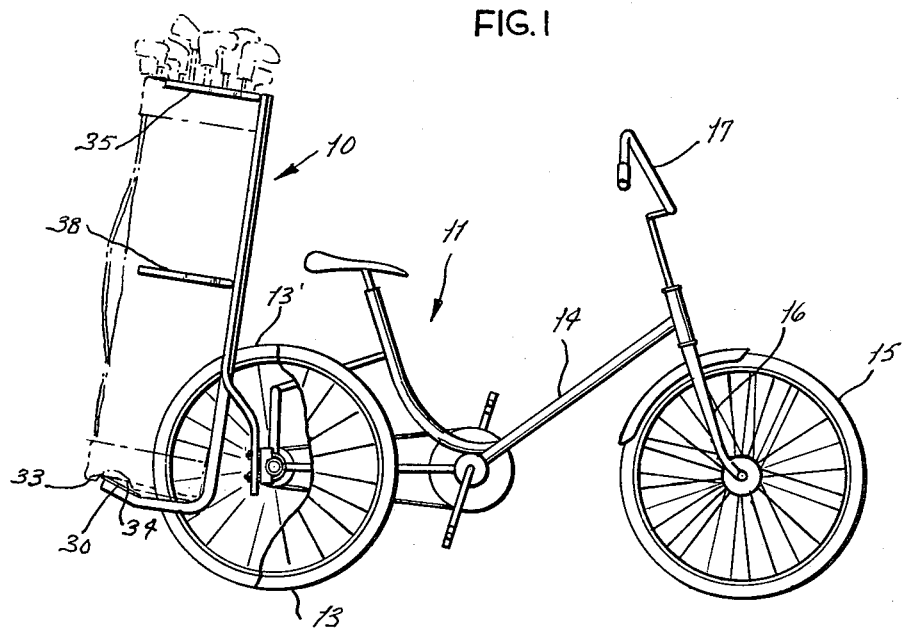
FIG. 1 is a side elevation view of an adult-style tricycle having mounted thereon a golf bag carrier in accordance with and embodying the present invention, such carrier being demonstrated as holding a golf bag.

Referring now by reference characters to the drawings, illustrated generally at 10 is a golf bag carrier of the invention as mounted upon a pedal-powered adult-style tricycle 11 for carrying a golf bag 12.

Being pedal-powered, tricycle 11 is thus a pedal cycle, and is representative of various types and manufactures of three-wheeled and four-wheeled cycles which are presently commercially available, there being a pair of rear wheels 13, 13' which are spaced apart in equal distance on opposite sides of the longitudinal center line of the frame 14 of the tricycle and with there being the usual single front wheel 15 mounted within a pair of front forks 16 and steerable by means of the customary handlebar 17.

Rear wheels 13, 13' are mounted on opposite ends of 19, 19' (FIG. 4) of a rear axle 20 having a drive sprocket 21 affixed thereto centrally between wheels 13, 13' and with the opposite ends 19, 19' being surrounded by corresponding tubular housings 23, 23' to which are connected frame 14, the axle 20 being suitably rotatably journalled within said housings 23, 23'.

In accordance with the invention, golf bag 12 is mounted upon carrier 10 in a generally upstanding position, the golf bag being of the typically essentially cylindrical vertically elongated type having the usual numerous clubs 24. Also, said golf bag 12 may be provided with numerous side pockets and features for carrying accessories, such as golf balls, tees, pencils, score cards, gloves, and other paraphenalia. Although not shown, such pockets are easily accommodated by carrier 10 and do not interfere with the mounting of the bag by carrier 10.

Figure 2:
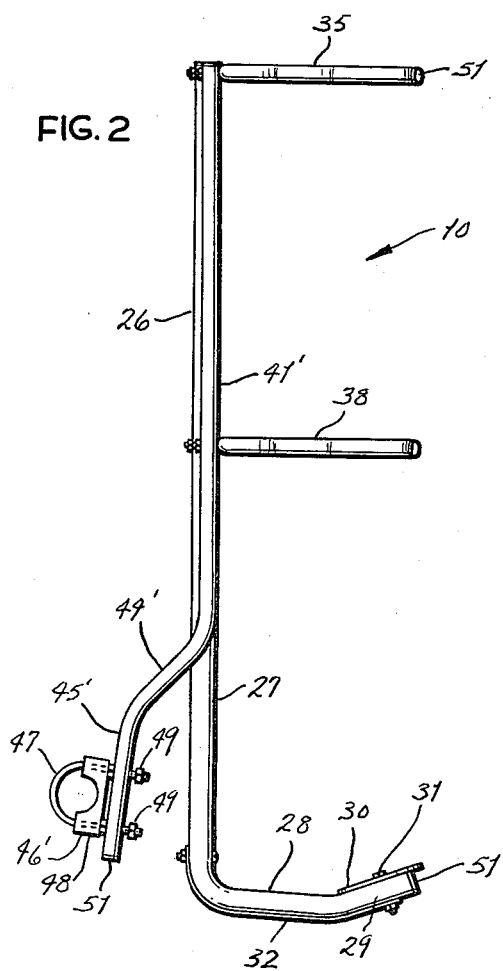
FIG. 2 is a side elevation of the new golf bag carrier.
Figure 3:
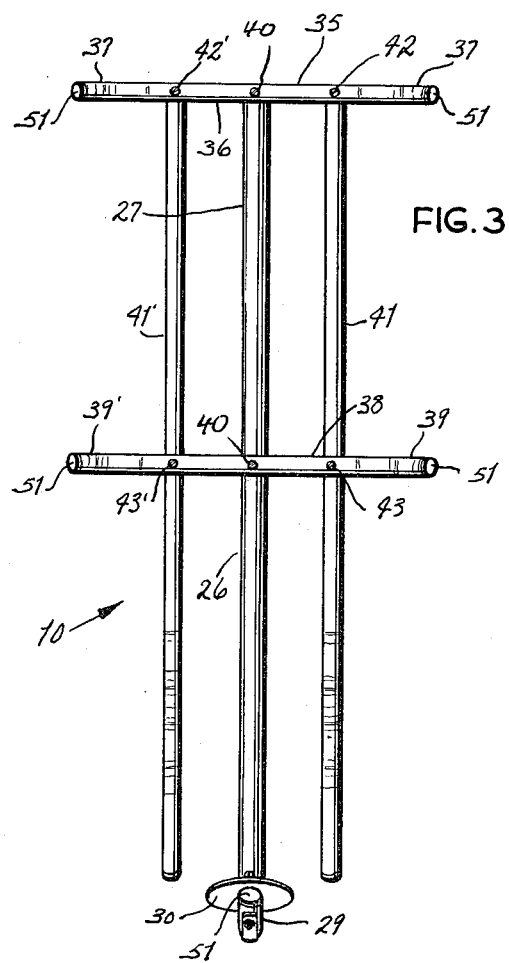
FIG. 3 is a rear elevation view of the golf bag carrier as mounted upon a tricycle in accordance with FIG. 1.
Figure 4:
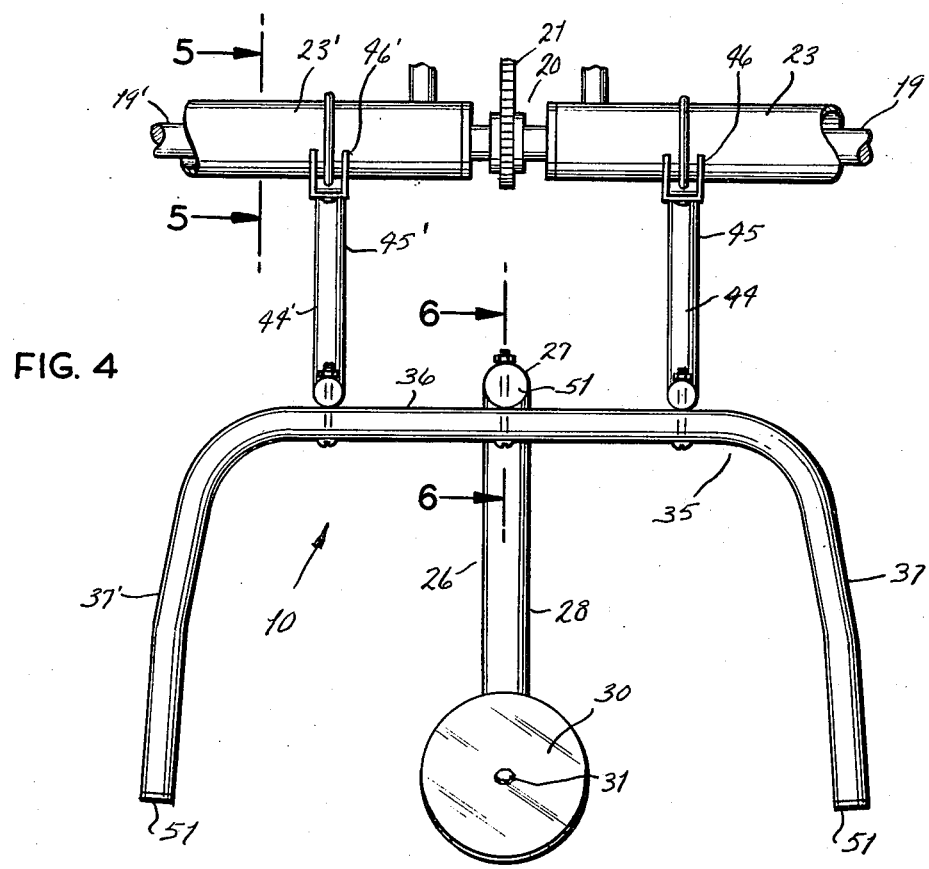
FIG. 4 is a top plan view of the new golf bag carrier, secured to axle housings of the tricycle.

Referring to FIGS. 2-4 in particular, the new golf bag carrier 10 comprises an L-shaped main golf bag supporting frame member 26 including an upstanding rectilinear portion 27 which extends substantially the height of the golf bag carrier and which is intended to be substantially co-extensive with at least the major portion of the height of golf bag 12. Said rectilinear portion 27 curvingly merges into a rearwardly extending substantially horizontal portion 28 terminating in an upwardly angled terminal portion 29 for providing a base member underlying golf bag 12 and carrying a support pedestal 30 thereon for supporting the weight of the golf bag.

Pedestal 30 is of circular shape, being stamped, for example, of aluminum plate material and bolted, as at 31, to the terminal portion 29 of frame member 26. It is preferred to bolt in place a sheet metal strap 32 under support portions 28, 29 for providing reinforcement and for providing an abrasion surface which protects portions 28, 29 from being abraded. There is thus provided a strong support, with pedestal 30 providing an increased surface area for bearing the weight of the golf bag which, as seen in FIG. 1, is conventionally constructed with a bottom which defines an edge 33 surrounding a bottom face 34 which bears against pedestal 30 and with said edge 33 maybe even extend slightly below pedestal 30 for reliable interengagement between the bag and bag carrier since pedestal 30 may cause some inward flexing of face 34.

Secured to the upper end of frame portion 27, as by a bolt 40, is a tubular lateral frame member 35 which, as seen in FIG. 4, is generally of U-shape in plan, being thus of generally arcuate or curvilinear character through at least a substantial portion of its length for surroundingly engaging golf bag 12, there being a short straight portion 36 and with opposite end portions 37, 37' positioned at opposite sides and being rearwardly directed for defining a recess to receive the bag. An identically configured lateral frame member 38 is similarly connected by a bolt 40 to upright frame member 26 at substantially its mid-point and similarly defines opposite ends 39, 39' which extend around the sides of the golf bag for surroundingly cradling at least a portion of the golf bag along its length for maintaining in laterally dispositioned substantially parallel relationship with the rectilinear frame portion 27 of frame member 26.

Referring particularly to FIG. 3, there are provided on opposite sides of frame member portion 27 a pair of upstanding frame supporting members 41, 41' which are bolted at their upper ends, as at 42, 42', to lateral frame member 35 and, as at 43, 43', to lateral frame member 38, thus providing a rigid, strong and well-braced frame construction.

Said upstanding frame supporting members 41, 41' are of generally rectilinear character throughout the major portion of their length. But each curves rearwardly to provide offset portions 44, 44' which angle forwardly toward axle housings 23, 23' and then are directed downwardly into portions 45, 45' connected to the respective axle housings 23, 23' by clamps 46, 46'.

Figure 5:
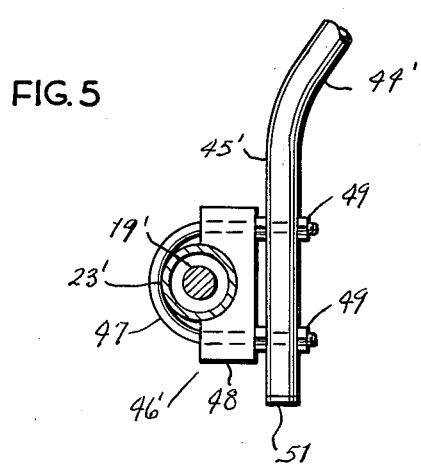
FIG. 5 is a fragmentary cross section, taken along line 5—5 of FIG. 4, demonstrating the axle housing attachment of the golf bag carrier.
Figure 6:
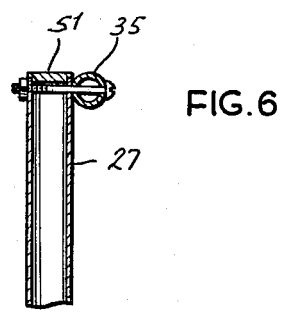
FIG. 6 is a fragmentary cross section, taken along line 6—6 of FIG. 4.

Referring to FIGS. 2 and 5, each of clamps 46, 46' comprises a U-shaped member, as at 47, which is clampingly received by a yoke portion 48 and with the ends of said U-shaped portion extending through the upstanding frame support member portions 45, 45' and bolted, as at 49, to rigidly clamp the golf bag carrier to the respective rear axle housings 23, 23' to prevent rotation of the carrier relative to the rear axle housings. Preferably, the orientation of the clamps with respect to the rear axle housings 23, 23' is such as to orient the rectilinear portion 27 of frame member 26 so that it is inclined slightly forwardly, as is demonstrated in FIG. 1, so that the center of gravity of bag 12 is located slightly forward of pedestal plate 30 and with the bag thus being in a stable position of equilibrium securely cradled within carrier 10 even though tricycle 11 may travel over relatively uneven terrain and cause bag 12 to experience jolting, swaying, etc. Adequate space exists forward of the bag carrier for mounting of a basket, if tricycle 11 is to be so equipped.

Tubular members 26, 35, 41 and 41' are preferably all of aluminum tubing of circular section, although it is preferred that the main tubular support frame member 26 be of substantially heavier gauge than other tubular members since it primarily bears the weight of the bag. Additionally, members 41 and 41' may be of heavier gauge tubing.

Further, it is preferred that the ends of the tubular members constituting bag carrier 10, such as especially lateral frame members 35, 38, be closed at the ends by plastic or metal plugs, as at 51, thus not only avoiding any sharp edges but also closing the interior of the tubular structure to prevent moisture, dirt, etc. from entering the tubular members.

Although the foregoing includes a description of the best mode contemplated for carrying our the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A golf bag carrier for an adult-style pedal cycle or the like having a pair of rear wheels connected by a pedal-driven axle and having at least one axle housing, characterized by said carrier comprising at least one elongated, generally upright main frame member, said main frame member being of L-shape having an upstanding rectilinear portion for lying adjacent said bag and a rearwardly extending supporting portion for extending under and supporting said bag, means carried at an outer end of said rearwardly extending portion for defining a pedestal for supporting the weight of a golf bag, and a plurality of lateral support members carried upward from said pedestal for laterally securing said golf bag, said lateral support members extending laterally with respect to said rectilinear portion for surroundingly cradling said bag, said lateral support members having horizontal rectilinear portions and arcuate terminal portions for extending around the sides of said golf bag, and frame support members interconnected with said lateral support members including lower ends remote from said lateral support members for securement to said cycle, said frame support members each including a rectilinear portion parallel to and substantially co-extensive with the rectilinear portion of said main frame member and located on a respective side thereof and interconnected with the horizontal rectilinear portions of said lateral support members, said frame support members each including an offset portion extending forwardly toward said axle housing and with said lower end extending below said offset portion, each said offset portion providing offset mounting of said golf bag rearwardly of said axle housing, and clamp means at the lower ends of each of the offset portions of said frame support members for clampingly engaging said axle housing, and said clamp means engaging said rear axle housing for locating said main frame therebehind with said rectilinear portion angled slightly forward with respect to vertical.

2. A golf bag carrier according to claim 1 and further characterized by said remote end being constituted by an upwardly angled portion, said pedestal being constituted by a circular plate affixed to said angled portion.

3. A golf bag carrier according to claim 1 and further characterized by said clamp means comprising U-shaped clamping members for surroundingly engaging said rear wheel axle.

4. A golf bag carrier according to claim 1 and further characterized by said main support member, lateral support members and frame support members all being of metal circular-section tubing.

5. A golf bag carrier according to claim 1 and further characterized by said supporting portion of said main support member being positioned lower than said axle housing, and including a metal strap secured to, and extending substantially the length of, the lower surface of said supporting portion.

6. A golf bag carrier for an adult-style pedal-powered tricycle or quadra-cycle having a pair of rear wheels connecting by a pedal-driven axle and having at least one axle housing having tubular portions enclosing opposite ends of said axle characterized by said carrier comprising an elongated golf bag main supporting frame member of L-shaped configuration including an upstanding rectilinear portion substantially co-extensive with at least a principal portion of the height of said golf bag and base portion extending laterally from said rectilinear portion for underlying said golf bag and carrying a support pedestal for supporting the weight of said golf bag, a plurality of curvilinearly configured lateral frame members affixed to said supporting frame member and extending laterally with respect thereto for surroundingly cradling at least a portion of said golf bag along its length for maintaining said golf bag laterally dispositioned in substantially parallel relationship with said upstanding frame portion, a pair of upstanding frame supporting members on opposite sides of said main frame member, each including an upright rectilinear portion affixed to each of said lateral frame members and each including an offset securement portion extending forwardly relative to said main supporting frame member for lying proximate a corresponding axle housing portion, and a U-shaped clamping fixture carried by each said securement portions for clampingly engaging a respective axle housing portion by surroundingly engaging said axle housing portion for securing said golf bag carrier to said tricycle or quadra-cycle with said golf bag oriented in upstanding relationship upwardly from and rearwardly of said axle with the weight thereof stably supported by said carrier.

* * * * *